United States Patent
Ueyama

(10) Patent No.: US 7,830,446 B2
(45) Date of Patent: Nov. 9, 2010

(54) IMAGE SENSING APPARATUS, IMAGE SENSING METHOD, PROGRAM, AND RECORDING MEDIUM PROVIDING SELECTIVE IMAGE CORRECTION

(75) Inventor: Teruhiko Ueyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 995 days.

(21) Appl. No.: 10/681,081

(22) Filed: Oct. 8, 2003

(65) Prior Publication Data

US 2004/0066464 A1   Apr. 8, 2004

(30) Foreign Application Priority Data

Oct. 8, 2002   (JP)   ............... 2002-294527

(51) Int. Cl.
  H04N 5/235   (2006.01)
  H04N 5/238   (2006.01)
(52) U.S. Cl. ...................... 348/362; 348/364
(58) Field of Classification Search ............... 348/362, 348/364, 221.1
  See application file for complete search history.

(56) References Cited

U.S. PATENT DOCUMENTS

| | | | |
|---|---|---|---|
| 6,654,062 B1 * | 11/2003 | Numata et al. | 348/362 |
| 7,030,911 B1 * | 4/2006 | Kubo | 348/221.1 |
| 7,136,101 B2 * | 11/2006 | Pyle | 348/333.01 |
| 2002/0080247 A1 * | 6/2002 | Takahashi et al. | 348/229 |
| 2004/0150738 A1 * | 8/2004 | Sakimoto et al. | 348/333.11 |
| 2005/0225664 A1 * | 10/2005 | Matsumoto | 348/362 |

FOREIGN PATENT DOCUMENTS

| | | | |
|---|---|---|---|
| JP | 2000-69356 | | 3/2000 |
| JP | 2000069356 A | * | 3/2000 |

* cited by examiner

Primary Examiner—Justin P Misleh
(74) Attorney, Agent, or Firm—Cowan, Liebowitz & Latman, P.C.

(57) ABSTRACT

An object of this invention is to limit a correction amount for correcting the exposure error of a photographed image so as to prevent an excessively corrected image sensing result, and obtain a desired image sensing result by changing the correction width of the correction amount in accordance with the setting state and operation state of an image sensing apparatus and the object brightness in image sensing. To achieve this object, an exposure error value is calculated from the exposure level of an image signal and an exposure level obtained by photometry. The correction amount of the exposure error value is calculated on the basis of at least one of the setting state of the image sensing apparatus, the operation state of the image sensing apparatus, and the object brightness state in image sensing. The exposure error of the sensed image is corrected using the correction amount.

9 Claims, 6 Drawing Sheets

IMAGE SENSING APPARATUS, IMAGE SENSING METHOD, PROGRAM, AND RECORDING MEDIUM PROVIDING SELECTIVE IMAGE CORRECTION

FIELD OF THE INVENTION

The present invention relates to an image sensing apparatus, image sensing method, program, and recording medium which realize high-precision exposure control.

BACKGROUND OF THE INVENTION

In an image processing apparatus such as an electronic camera which uses a memory card having a solid-state memory element as a recording medium, and prints and plays back still and moving images, the latitude of a solid-state image sensing element is much smaller than that of the film of a silver halide camera, and higher exposure precision is required. Conventionally, complicated, advanced calculation processing is performed to determine an accurate exposure value, and various measures are taken to increase the exposure precision.

For example, a method of correcting an error from a correct exposure level after image sensing (Japanese Patent Laid-Open No. 2000-69356) has already been known as a technique of reducing variations in the exposure level of a sensed image that are caused by the mechanical error of a shutter or stop or the error of an electrical factor such as a photometry element, image sensing element, or gain amplifier.

In this prior art, however, exposure level correction after image sensing may fail to obtain a desired image sensing result depending on the setting state and operation state of an image sensing apparatus.

SUMMARY OF THE INVENTION

It is an object of the present invention to provide an image sensing apparatus, program, and recording medium which limit a correction amount for correcting the exposure error of a photographed image so as to prevent an excessively corrected image sensing result, and can obtain a desired image sensing result by changing the correction width of the correction amount in accordance with the setting state and operation state of the image sensing apparatus and the object brightness in image sensing.

To achieve the above object, according to the first aspect of the present invention, an image sensing apparatus is comprising a setting state determination device which determines a setting state of the image sensing apparatus in image sensing, an exposure calculation device which performs photometry for image sensing to calculate an exposure level upon an image sensing preparation instruction by an image sensing preparation instruction member, an exposure level calculation device which calculates an exposure level of an image signal output after image sensing, an exposure correction calculation device which calculates an exposure error value from the exposure level calculated by the exposure calculation device and the exposure level of a sensed image that is calculated by the exposure level calculation device, and calculates a correction amount of the exposure error value on the basis of at least one of the setting state of the image sensing apparatus that is obtained by the setting state determination device, an operation state of the image sensing apparatus, and an object brightness state in image sensing, and an exposure error correction device which corrects an exposure error of the sensed image by using the correction amount calculated by the exposure correction calculation device.

According to the second aspect of the present invention, an image sensing method is comprising a processing step of determining a setting state of an image sensing apparatus in image sensing, a processing step of performing photometry for image sensing to calculate an exposure level upon an image sensing preparation instruction by an image sensing preparation instruction member, a processing step of calculating an exposure level of an image signal output after image sensing, and a processing step of calculating an exposure error value from the exposure level obtained by the photometry and the exposure level of the image signal, wherein a correction amount of the exposure error value is calculated on the basis of at least one of the setting state of the image sensing apparatus, an operation state of the image sensing apparatus, and an object brightness state in image sensing, and an exposure error of the sensed image is corrected using the correction amount.

According to the third aspect of the present invention, a program is characterized by causing a computer to execute a processing procedure having a processing step of determining a setting state of an image sensing apparatus in image sensing, a processing step of performing photometry for image sensing to calculate an exposure level upon an image sensing preparation instruction by an image sensing preparation instruction member, a processing step of calculating an exposure level of an image signal output after image sensing, and a processing step of calculating an exposure error value from the exposure level obtained by the photometry and the exposure level of the image signal, wherein a correction amount of the exposure error value is calculated on the basis of at least one of the setting state of the image sensing apparatus, an operation state of the image sensing apparatus, and an object brightness state in image sensing, and an exposure error of the sensed image is corrected using the correction amount.

According to the fourth aspect of the present invention, a recording medium is characterized by computer-readably recording the above program.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

Figure 1:
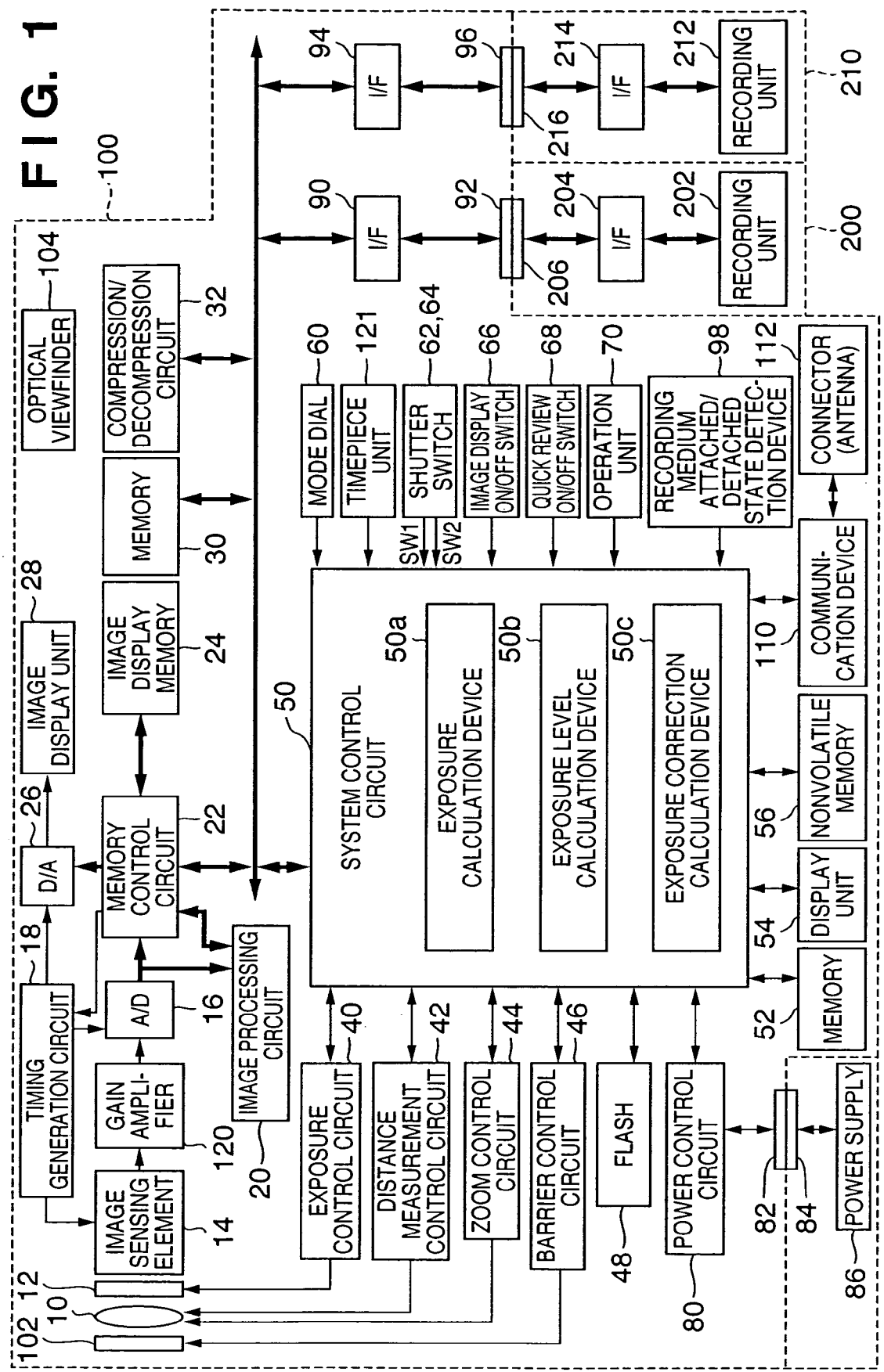
FIG. 1 is a block diagram showing the schematic arrangement of an image processing apparatus according to each embodiment of the present invention.

FIG. 1 is a block diagram showing the schematic arrangement of an image processing apparatus according to each embodiment of the present invention.

In FIG. 1, reference numeral 100 denotes an image processing apparatus; 10, an image sensing lens; 12, a shutter having a stop function; 14, an image sensing element which converts an optical image into an electrical signal; 120, a gain amplifier which amplifies an analog signal output from the image sensing element 14 and sets the camera sensitivity; 16, an A/D converter which converts an analog signal output from the image sensing element 14 into a digital signal; and 18, a timing generation circuit which supplies a clock signal and control signal to the image sensing element 14, the A/D converter 16, and a D/A converter 26 under the control of a memory control circuit 22 and system control circuit 50.

Reference numeral 20 denotes an image processing circuit which performs predetermined pixel interpolation processing and color conversion processing on data from the A/D converter 16 or data from the memory control circuit 22. The image processing circuit 20 also performs predetermined calculation processing using sensed image data. Based on the obtained calculation result, the system control circuit 50 performs TTL (Through-The-Lens) AF (Auto Focus) processing, AE (Auto Exposure) processing, and EF (pre-flash) processing which are control for an exposure control circuit 40 and distance measurement control circuit 42. Further, the image processing circuit 20 performs predetermined calculation processing using sensed image data, and also performs TTL AWB (Auto White Balance) processing on the basis of the calculation result.

The memory control circuit 22 controls the A/D converter 16, the timing generation circuit 18, the image processing circuit 20, an image display memory 24, the D/A converter 26, a memory 30, and a compression/decompression circuit 32. Data from the A/D converter 16 is written into the image display memory 24 or memory 30 via the image processing circuit 20 and memory control circuit 22, or directly via the memory control circuit 22.

The system control circuit 50 controls the image processing apparatus 100, and incorporates an exposure calculation device 50a, exposure level calculation device 50b, and correction gain calculation device 50c. The exposure calculation device 50a calculates a correct exposure value on the basis of the luminance level measured by the TTL via the memory control circuit 22, and controls the exposure control circuit 40. The exposure level calculation device 50b calculates an exposure level from sensed image data via the memory control circuit 22. The exposure correction value calculation device 50c compares an exposure (luminance) level measured by the exposure calculation device 50a and an exposure level calculated by the exposure level calculation device 50b, and calculates a correction value (exposure error correction value for correcting the error of an exposure correction value on the basis of the exposure error value, the setting state of the image sensing apparatus, and the like) so as to set a correct level. The correction value (correct exposure value) is added by the image processing circuit 20 for digital gain correction.

Reference numeral 24 denotes the image display memory; 26, the D/A converter; and 28, an image display unit comprised of a TFT, LCD, or the like. Display image data written in the image display memory 24 is displayed on the image display unit 28 via the D/A converter 26. An electronic viewfinder function can be realized by sequentially displaying sensed image data on the image display unit 28. The image display unit 28 arbitrarily turns on/off its display in accordance with an instruction from the system control circuit 50. If the display is turned off, the power consumption of the image processing apparatus 100 can be greatly reduced.

The memory 30 for storing sensed still and moving images has a sufficient storage capacity for storing a predetermined number of still images and a moving image for a predetermined period. In sequential shooting to sequentially shoot a plurality of still images or in panoramic image sensing, a large number of images can be written in the memory 30 at a high speed. The memory 30 can also be used as a work area for the system control circuit 50.

The compression/decompression circuit 32 compresses or decompresses image data by adaptive discrete cosine transformation (ADCT) or the like. The compression/decompression circuit 32 loads an image stored in the memory 30, compresses or decompresses the image, and writes the processed data in the memory 30.

The exposure control circuit 40 controls the shutter 12 having a stop function, and also has a flash dimming function in cooperation with a flash 48 to be described later. The distance measurement control circuit 42 controls focusing of the image sensing lens 10. Reference numeral 44 denotes a zoom control circuit which controls zooming of the image sensing lens 10; and 46, a barrier control circuit which controls the operation of a protection member 102 serving as a barrier. The flash 48 has an AF auxiliary light projection function and flash adjusting function.

The exposure control circuit 40 and distance measurement control circuit 42 are controlled by the TTL method. The system control circuit 50 controls the exposure control circuit 40 and distance measurement control circuit 42 on the basis of the calculation result of calculating sensed image data by the image processing circuit 20.

Reference numeral 52 denotes a memory which stores constants, variables, programs, and the like for operating the system control circuit 50. Reference numeral 54 denotes a display unit including a liquid crystal display device and loudspeaker which display and output operating states, messages, and the like by using characters, images, sound, and the like in accordance with execution of a program by the system control circuit 50. One or a plurality of display units 54 are arranged at easy-to-see positions near the operation unit of the image processing apparatus 100. Each display unit 54 is formed by a combination of an LCD, LED, sound generating element, and the like. Some functions of the display unit 54 are provided within an optical viewfinder 104.

The display contents of the display unit 54 that are displayed on the LCD or the like include indication of single-shot/sequential shooting, a self timer, a compression ratio, the number of recording pixels, the number of recorded images, the number of recordable images, a shutter speed, an F-number, exposure compensation, flash illumination, pink-eye effect mitigation, macro image sensing, a buzzer setting, a remaining timer battery level, a remaining battery level, an error state, information of plural digit numbers, the attached/detached status of recording media 200 and 210, the operation of a communication I/F, and date and time. The display contents of the display unit 54 that are displayed within the optical viewfinder 104 include an in-focus state, a camera shake warning, a flash charge state, a shutter speed, an F-number, and exposure compensation.

Reference numeral 56 denotes an electrically erasable and recordable nonvolatile memory which is typically an EEPROM.

Reference numerals 62, 64, 66, 68, and 70 denote operation members used to input various operation instructions to the system control circuit 50. These operation members 62, 64, 66, 68, and 70 comprise one or a plurality of combinations of switches, dials, touch panels, pointing devices using visual axis detection, voice recognition devices, and the like. These operation members will be described in detail.

The shutter switch SW1 62 is turned on by half stroke of a shutter switch member (not shown) to designate the start of image sensing preparation operation for AF (Auto Focus) processing, AE (Auto Exposure) processing, AWB (Auto White Balance) processing, and EF (pre-flash) processing. The shutter switch SW2 64 is turned on by full stroke of the shutter switch member (not shown) to designate the start of image sensing operation for a series of processes such as exposure processing of writing a signal read out from the image sensing element 12 into the memory 30 via the A/D converter 16 and memory control circuit 22, development processing using calculation by the image processing circuit 20 and memory control circuit 22, and recording processing of reading out image data from the memory 30, compressing the image data by the compression/decompression circuit 32, and writing the image data into the recording medium 200 or 210. The image display ON/OFF switch 66 can set the ON/OFF state of the image display unit 28. With this function, current supply to the image display unit 28 formed by a TFT LCD or the like is stopped in image sensing using the optical viewfinder 104, thus reducing power. The quick review ON/OFF switch 68 sets a quick review function of automatically playing back sensed image data immediately after image sensing. Each embodiment particularly comprises a function of setting the quick review function when the image display unit 28 is turned off.

Reference numeral 121 denotes a timepiece unit which can measure the time until the shutter switch SW2 is pressed after the shutter switch SW1 is pressed. The operation unit 70 comprises various buttons and touch panels, and includes a menu button, a set button, a macro button, a multi-image playback/repaging button, a flash set button, a single-shot/sequential shooting/self-timer switching button, a forward (+) menu item selection button, a backward (−) menu item selection button, a forward (+) playback image search button, a backward (−) playback image search button, an image sensing quality selection button, an exposure correction button, and a date/time set button.

Reference numeral 80 denotes a power control circuit which comprises a battery detection circuit, a DC/DC converter, and a switch circuit which switches a block to be energized. The power control circuit 80 detects the attached/detached state of the battery, a battery type, and a remaining battery power level. The power control circuit 80 controls the DC/DC converter on the basis of detection results and an instruction from the system control circuit 50, and supplies a necessary voltage to respective parts including a recording medium for a necessary period.

Reference numerals 82 and 84 denote connectors; and 86, a power supply including a primary battery (e.g., an alkaline battery or lithium battery), a secondary battery (e.g., an NiCd battery, NiMH battery, or Li battery), and an AC adaptor.

Reference numerals 90 and 94 denote interfaces for recording media such as a memory card and hard disk; 92 and 96, connectors which connect recording media such as a memory card and hard disk; and 98, a recording medium attached/detached state detection device which detects whether the recording medium 200 or 210 is attached to the connector 92 or 96.

Each embodiment adopts two systems of interfaces and connectors which connect a recording medium. However, one or a plurality of systems of interfaces and connectors which connect a recording medium may be arranged. Further, interfaces and connectors pursuant to different standards may be combined. As the interfaces and connectors, cards in conformity with PCMCIA card standards and cards in conformity with CF (compact memory (Compact Flash®)) card standards may be used.

In a case wherein cards and connectors in conformity with the PCMCIA card standards, CF card standards, and the like are used as the interfaces 90 and 94 and the connectors 92 and 96, image data and management information accessory to the image data can be transferred between the image processing apparatus and other peripheral devices such as a computer and printer by connecting various communication cards such as a LAN card, modem card, USB card, IEEE 1394 card, P1284 card, SCSI card, and PHS card.

The protection member 102 is a barrier which prevents contamination and damage of an image sensing portion by covering the image sensing portion including the lens 10 of the image processing apparatus 100. The optical viewfinder 104 allows sensing an image by using only the optical viewfinder without using any electronic viewfinder function of the image display unit 28. The optical viewfinder 104 displays some functions of the display unit 54 such as a focus state, a camera shake warning, a flash charge state, a shutter speed, an F-number, and exposure compensation.

Reference numeral 110 denotes a communication device having various communication functions for RS232C, USB, IEEE 1394, P1284, SCSI, modem, LAN, and wireless communication; and 112, a connector or an antenna in wireless communication which connects the image processing apparatus 100 to another device via the communication device 110.

The recording medium 200 is a memory card, hard disk, or the like. The recording medium 200 comprises a recording unit 202 formed by a semiconductor memory, magnetic disk, or the like, an interface 204 for the image processing apparatus 100, and a connector 206 which connects the image processing apparatus 100. Also, the recording medium 210 is a memory card, hard disk, or the like. The recording medium 210 comprises a recording unit 212 formed by a semiconductor memory, magnetic disk, or the like, an interface 214 for the image processing apparatus 100, and a connector 216 which connects the image processing apparatus 100.

First Embodiment

Figure 2:
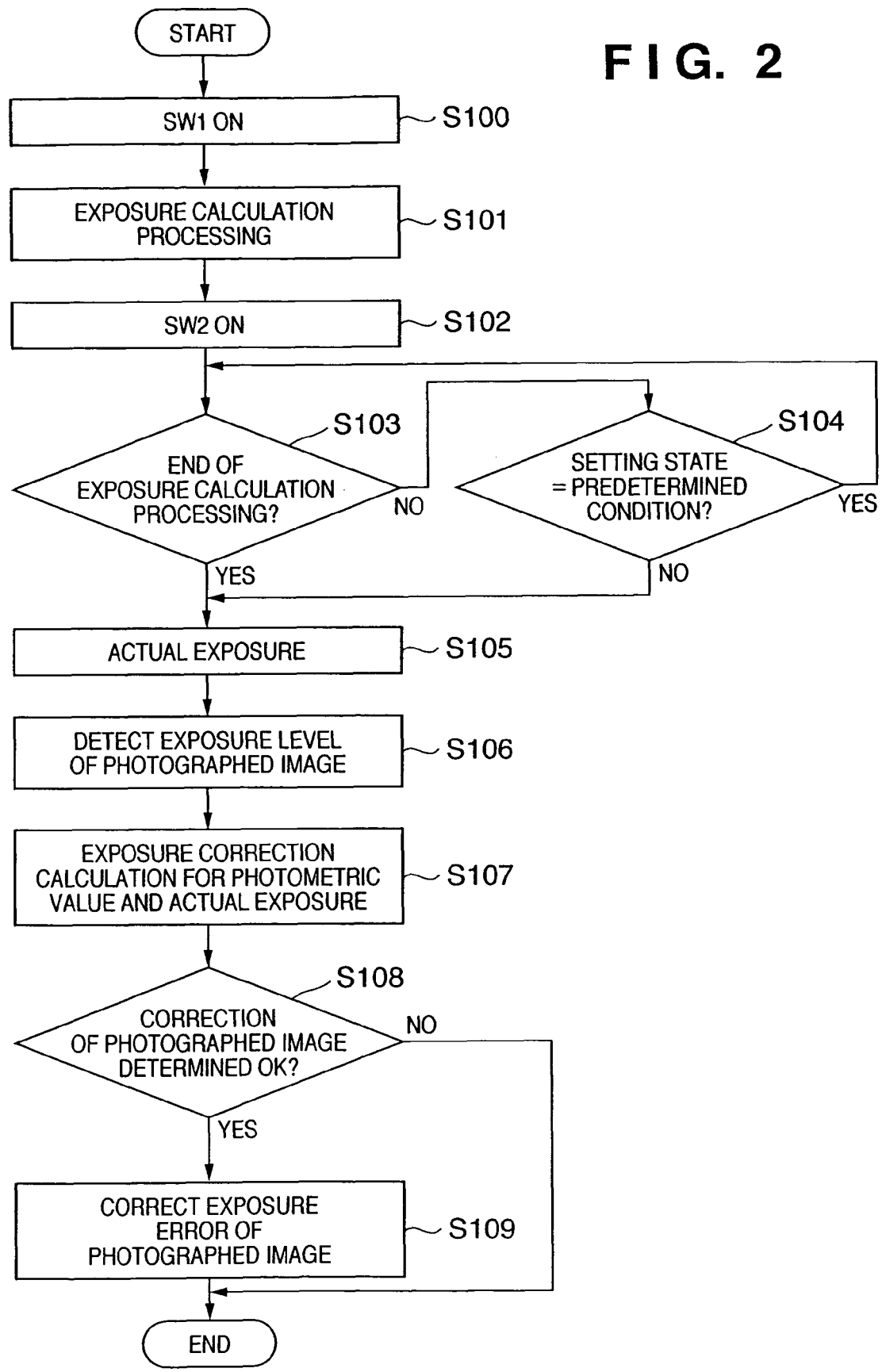
FIG. 2 is a flow chart showing the operation of main part of an image processing apparatus according to the first embodiment of the present invention.

FIG. 2 is a flow chart showing the main routine of an image processing apparatus 100 according to the first embodiment of the present invention. The operation will be explained with reference to FIGS. 1 and 2.

If a shutter switch SW1 is pressed (S100), exposure calculation processing starts, and an exposure value is calculated from a photometric value (S101). A shutter switch SW2 is pressed (S102), and if exposure calculation processing ends, actual exposure is executed on the basis of the exposure value calculated in S101 (Y in S103→S105).

At this time, if exposure calculation processing in S101 has not ended before the shutter switch SW2 is pressed after the shutter switch SW1 is pressed (N in S103), and the setting state in image sensing satisfies a given condition (Y in S104), this operation is repeated till the end of exposure calculation processing (N in S103→Y in S104→N in S103→Y in S104 . . . ) without actual exposure. After exposure calculation ends, actual exposure is done (N in S104→S105). If the setting state in image sensing does not satisfy the given condition (N in S104), exposure calculation processing in S101 is interrupted, and actual exposure is executed at an exposure value during setting (S105).

Figure 3:
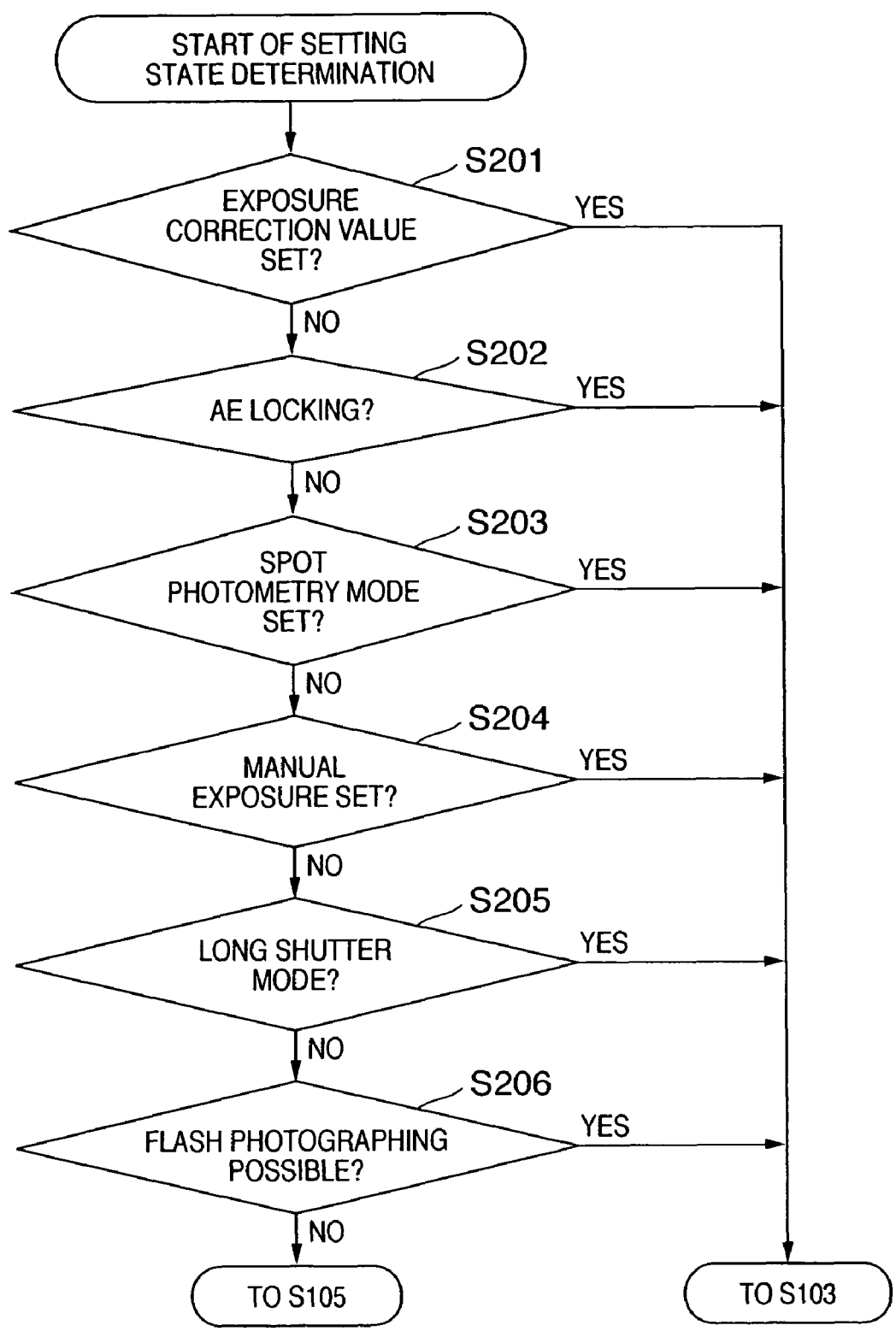
FIG. 3 is a flow chart showing the operation of main part of the image processing apparatus according to the first embodiment of the present invention.

The given condition of the setting state is a condition shown in FIG. 3. In a setting state in which no exposure error correction is performed, actual exposure must wait till the end of exposure calculation processing. The reason for not performing exposure error correction will be described in the explanation of an exposure error correction determination condition (S108).

In FIG. 3, whether an exposure correction value has been set is determined as determination of one condition of the setting state (S201). If an exposure correction value has been set (Y in S201), no actual exposure is done till the end of exposure calculation processing (to S103 in FIG. 2). If no exposure correction value has been set (N in S201), whether AE locking (exposure value fixation) has been set is determined as condition determination (S202). If AE locking has been set (Y in S202), no actual exposure is performed till the end of exposure calculation processing (to S103 in FIG. 2). If no AE locking has been set (N in S202), the flow shifts to the next condition determination.

Whether a spot photometry mode has been set is determined as the next condition determination (S203). If the spot photometry mode has been set (Y in S203), no actual exposure is performed till the end of exposure calculation processing (to S103 in FIG. 2). If no spot photometry mode has been set (N in S203), whether manual exposure has been set is determined as condition determination (S204). If manual exposure has been set (Y in S204), no actual exposure is done till the end of exposure calculation processing (to S103 in FIG. 2). If no manual exposure has been set (N in S204), the flow shifts to the next condition determination.

Whether a long shutter mode has been set is determined as the next condition determination (S205). If the long shutter mode has been set (Y in S205), no actual exposure is done till the end of exposure calculation processing (to S103 in FIG. 2). If no long shutter mode has been set (N in S205), whether a state in which the flash can emit light has been set is determined (S206). If the state in which the flash can emit light has been set (Y in S206), no actual exposure is done till the end of exposure calculation processing (to S103 in FIG. 2). If a state in which flash emission is inhibited has been set (N in S206), exposure calculation processing is interrupted, and actual exposure is performed using an exposure calculation result obtained during processing (to S105 in FIG. 2).

Referring back to FIG. 2, the exposure level of the next sensed image is calculated to obtain an exposure error value and exposure correction value (S106→S107).

More specifically, in S106, the exposure level of a sensed image is obtained by calculation using the same photometry method and photometry area as those in photometry. In S107, as shown in the flow chart of FIG. 4, the target exposure level in photometry and the exposure level of a sensed image are compared to calculate the exposure error and exposure correction value of the sensed image (S301), an exposure correction value is obtained (S302), and the flow ends (S303).

For example, letting Yi be the exposure (luminance) level of a sensed image, and Ym be the exposure level in photometry, an exposure error α between them can be expressed as a luminance step:

$$\alpha = \text{Log}_2 Yi/Ym$$

After that, correction of the sensed image is determined (S108). That is, whether to correct the exposure error of the sensed image is determined. This determination condition will be explained with reference to the flow chart of FIG. 5.

Figure 5:
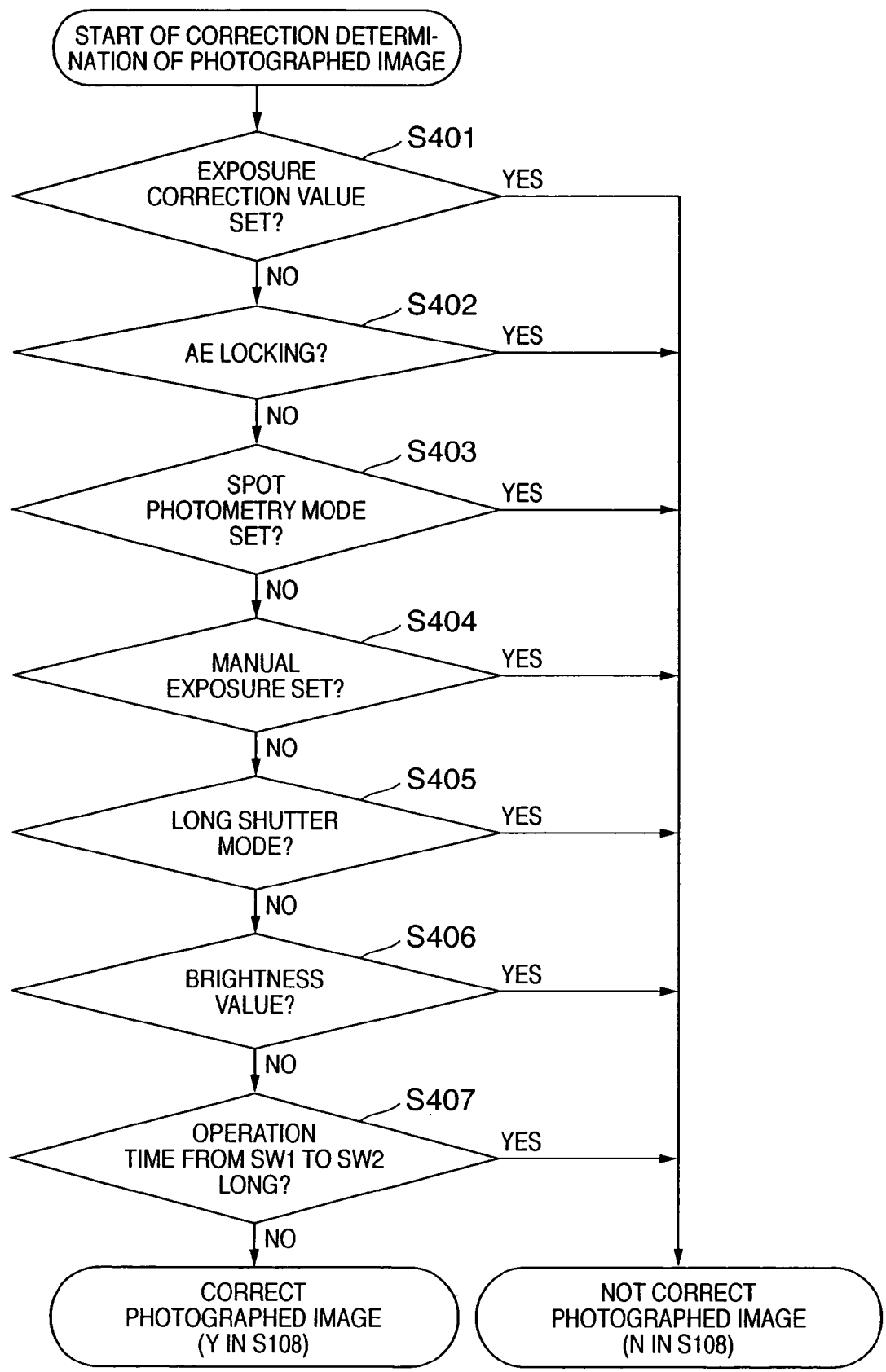
FIG. 5 is a flow chart showing the operation of main part of the image processing apparatus according to the first embodiment of the present invention.

In FIG. 5, whether an exposure correction value has been set is determined as condition determination (S401). If the exposure correction value has been set (Y in S401), no exposure error correction is performed for the sensed image (N in S108 of FIG. 2). When an exposure correction value has been set, exposure levels in image sensing and photometry are different from each other in a camera which executes photometry without considering any exposure correction amount and sets an exposure condition by moving the exposure correction amount from the photometry result on the auto exposure diagram. If an exposure error is corrected after correction of an exposure level in photometry by an exposure correction amount, the effect of the exposure correction function which requires fine exposure setting may be impaired. To prevent this, when an exposure correction value has been set, no exposure error is corrected. If no exposure correction value has been set (N in S401), the flow shifts to the next condition determination.

Whether AE locking (exposure value fixation) has been set is determined as the next condition determination (S402). If AE locking has been set (Y in S402), the exposure error of the sensed image is not corrected (N in S108 of FIG. 2). In the use of AE locking, the photographer often determines that auto exposure is not correct. Framing is different between photometry and image sensing, and in many cases, exposure error correction does not provide a preferable result. For this reason, when AE locking has been set, no exposure error is corrected. If no AE locking has been set (N in S402), the next condition determination is executed.

Whether the spot photometry mode has been set is determined as the next condition determination (S403). If the spot photometry mode has been set (Y in S403), the exposure error of the sensed image is not corrected (N in S108 of FIG. 2). The spot photometry mode is often set when the photographer wants to execute photometry for part of an object and determine exposure conditions. Framing is different between photometry and image sensing, and in many cases, exposure error correction does not provide a preferable result. Thus, when the spot photometry mode has been set, no exposure error is corrected. If no spot photometry mode has been set (N in S403), the next condition determination is executed.

Whether manual exposure has been set is determined as the next condition determination (S404). If manual exposure has been set (Y in S404), the exposure error of the sensed image is not corrected (N in S108 of FIG. 2). When manual exposure is set, the photographer determines exposure conditions by his/her will and takes a picture. In many cases, exposure error correction using a photometric value does not achieve a preferable result. When, therefore, manual exposure has been set, no exposure error is corrected. If no manual exposure has been set (N in S404), the next condition determination is executed.

Whether the long shutter mode has been set is determined as the next condition determination. If the long shutter mode has been set (Y in S405), the exposure error of the sensed image is not corrected. In the long shutter mode, exposure error correction does not provide a preferable result owing to the linearity of an image sensing element or gain amplifier, the influence of noise by a dark current, or the like. Hence, when the long shutter mode has been set, no exposure error is corrected. If no long shutter mode has been set (N in S405), the next condition determination is executed.

The brightness value is determined as the next condition determination (S406). If the brightness value is higher or lower than a preset brightness level range (Y in S406), the exposure error of the sensed image is not corrected (N in S108 of FIG. 2). When the brightness value is around the photometry limit or exceeds it, the photometry precision is not high. For this reason, when the brightness value is a brightness level exceeding a preset range (e.g., photometry enable range), no exposure error is corrected. More specifically, when the brightness of an object to be sensed, which is an object brightness state, is higher than a preset upper limit brightness, or lower than a preset lower limit brightness, the correction amount of the exposure error correction value is not calculated, and the exposure error of the sensed image is not corrected. When the brightness value falls within the preset brightness level range (N in S406), the next condition determination is executed.

The time interval until the shutter switch SW2 is pressed after the switch SW1 is pressed is determined as the next condition determination in an image sensing apparatus in which the exposure value is fixed by pressing the shutter switch SW1 (S407). If the time interval is equal to or longer than a given threshold time (Y in S407), the exposure error of the sensed image is not corrected (N in S108). If the time until the shutter switch SW2 is pressed to start image sensing after the shutter switch SW1 is pressed to fix the exposure value is long, framing may change between photometry and image sensing, or the object brightness may change. In many cases, even exposure error correction does not provide a preferable result. Hence, when the interval until the shutter switch SW2 is pressed after the shutter switch SW1 is pressed is equal to or longer than the given threshold time, no exposure error correction is done. If the interval until the shutter switch SW2 is pressed after the shutter switch SW1 is pressed is equal to or shorter than the given threshold time (N in S407), the exposure error of the sensed image is corrected (Y in S108 of FIG. 2).

Figure 6:
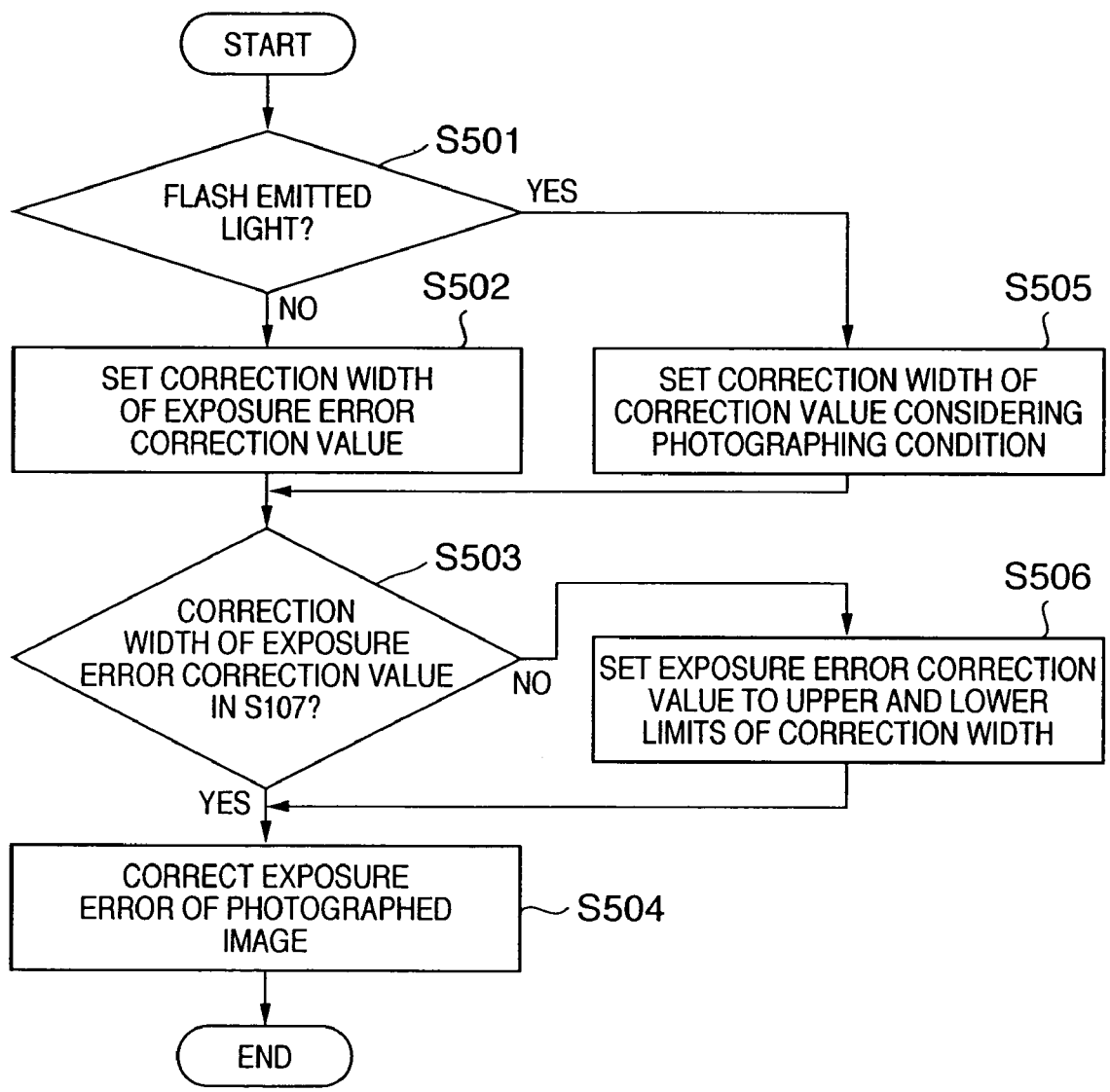
FIG. 6 is a flow chart showing the operation of main part of the image processing apparatus according to the first embodiment of the present invention.

If the exposure error correction determination is Y in S108 of FIG. 2, the exposure error of the sensed image is corrected. More specifically, as shown in the flow chart of FIG. 6, whether the flash has emitted light in image sensing is determined. If the flash has emitted light (Y in S501), the correction width of the correction value is set in consideration of flashlight amount
distance to an object
F-number
sensitivity setting value (S505). For example, (1) when the flashlight amount is small, the influence of emission nonuniformity easily appears, exposure may be insufficient, and thus the correction width is widened. Also when the flashlight amount is smaller than a proper emission amount, the correction value is similarly increased.

(2) When the distance to an object is long, flashlight does not satisfactorily reach the object, exposure may be insufficient, and thus the correction width is widened.

(3) When the stop is stopped down, the flashlight amount may be insufficient, and thus the correction width is widened.

(4) When the set sensitivity is low, the flashlight traveling distance is short, and thus the correction width is widened.

At least one of these conditions is set to set the correction width of the exposure error correction value, and the flow shifts to S503.

If the flash has not emitted light in image sensing (N in S501), a correction width not to decrease the gray level or S/N upon correction is prepared in advance and set as the correction width of the exposure error correction value (S502), and then the flow shifts to S503.

Figure 4:
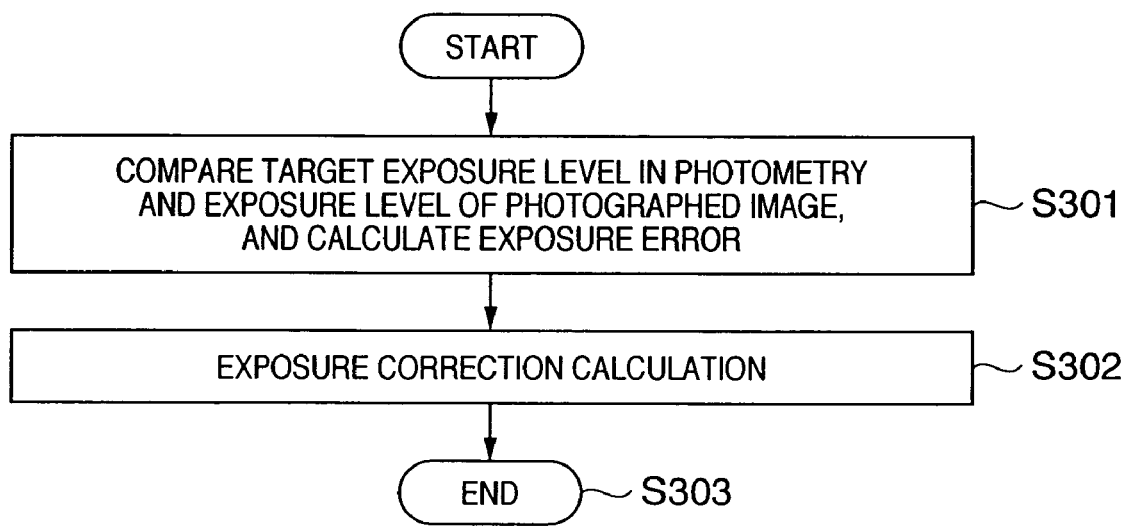
FIG. 4 is a flow chart showing the operation of main part of the image processing apparatus according to the first embodiment of the present invention.

Whether the exposure error correction value calculated in S302 of FIG. 4 falls within the correction width range is determined. If the exposure error correction value falls within the correction range (Y in S503), the exposure error of the sensed image is corrected (S504).

If the exposure error correction value falls outside the correction width range (N in S503), the exposure error correction value is set to the upper limit value of the correction width when the exposure error correction value is larger than the upper limit value of the correction width, and the lower limit value of the correction width when the exposure error correction value is smaller than the lower limit value of the correction width (S506). The exposure error of the sensed image is then corrected (S504). As a correction method, the sensed image may be multiplied by a gain corresponding to the correction amount, or the white balance coefficient or gamma may be corrected in performing developing processing for an image from RAW data (raw data obtained by A/D-converting information read from an image sensing element).

Second Embodiment

In the first embodiment, the conditions in S201 to S206 of FIG. 3 are sequentially determined as the contents of determination (S104 in FIG. 2) of the setting state. The order of the determination conditions may be changed, or all the items of the determination conditions may not be checked. For example, one or more determination conditions suffice to be checked.

Third Embodiment

In the first and second embodiments, the conditions in S401 to S407 of FIG. 5 are sequentially determined as determination (S108 in FIG. 2) of exposure error correction of a sensed image. The order of the determination conditions may be changed, or all the items of the determination conditions may not be checked. For example, one or more determination conditions suffice to be checked.

Fourth Embodiment

In the first to third embodiments, in setting the correction width of exposure error correction of an image sensed with flashlight, the correction width of the correction value is set in consideration of image sensing conditions:

flashlight amount
distance to an object
F-number
sensitivity setting value (S505). The correction width may also be set by setting arbitrary conditions such as an image sensing scene, an image sensing mode, and the view angle of a lens in addition to the above determination conditions.

Fifth Embodiment

In the first to fourth embodiments, exposure error correction determination (S108 in FIG. 2) of a sensed image is executed immediately after exposure error calculation (S107 in FIG. 2). Determination may be performed at an arbitrary timing immediately before exposure error correction of a sensed image immediately after determination of image sensing conditions.

In the description of the above embodiments, the image sensing mode is an auto exposure mode. The auto exposure mode is generally an auto setting mode conforming to an object to be sensed, such as a landscape mode, portrait mode, night scene mode, close-up image sensing mode, pan-focus mode, color effect mode, or moving image mode. The image sensing mode when the photographer sets an exposure parameter, which has been described in the fourth embodiment, is an image sensing mode generally called a manual mode, aperture priority mode, shutter priority mode, or program shift mode.

In the description of the embodiments, immediately when the shutter switch SW2 is pressed before the end of exposure calculation processing, exposure calculation processing is interrupted even during exposure calculation, and the setting state is determined (S104 in FIG. 2). Alternatively, the timepiece unit 121 may count the time until the shutter switch SW2 is pressed after the shutter switch SW1 is pressed, and if the counted time is equal to or longer than a given threshold t, processing may continue without interrupting exposure calculation processing until the exposure control value is obtained.

The recording media 200 and 210 may be composite media formed by integrating memory cards, hard disks, and the like. Part of such composite medium may be detachable.

In the description of the embodiments, the recording media 200 and 210 are separated from the image processing apparatus 100, and are arbitrarily connectable. Either or both of the recording media may be fixed to the image processing apparatus 100. One or an arbitrary number of recording media 200 or 210 may be connectable to the image processing apparatus 100. In the above-described arrangement, the recording media 200 and 210 are mounted in the image processing apparatus 100. One or a plurality of recording media may be mounted.

In the prior art, the target precision of exposure calculation is decreased (the calculation count of the auto exposure control device is decreased) to reduce the release time lag, and an exposure error is corrected to correct exposure nonuniformity caused by the mechanical precision or the like. Instead of this, according to the above-described embodiments, the correction amount (exposure error correction value) is so limited as to prevent an excessively corrected image sensing result. At the same time, a desired image sensing result can be obtained by changing the limit width of the correction amount (S502 and S505 in FIG. 6) in accordance with the setting state (S401 to S405 in FIG. 5) and operation state (S407) of the image sensing apparatus and the object brightness (S406).

The same effects can also be obtained when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the functions of the above-described embodiments, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

Furthermore, the present invention includes a case where, after the program codes read out from the storage medium are written in the memory of a function expansion board inserted into the computer or the memory of a function expansion unit connected to the computer, the CPU of the function expansion board or function expansion unit performs part or all of actual processing on the basis of the instructions of the program codes and thereby realizes the functions of the above-described embodiments.

Correspondence Between Invention and Embodiments

Part of the system control circuit 50 that executes determinations in S201 to S206 of FIG. 3 corresponds to a setting state determination device according to the present invention which determines the setting state of an image sensing apparatus in image sensing. The exposure calculation device 50a corresponds to an exposure calculation device according to the present invention which performs photometry for image sensing to calculate the exposure level. The exposure level calculation device 50b corresponds to an exposure level calculation device according to the present invention which calculates the exposure level of an image signal. The exposure correction calculation device 50c corresponds to an exposure correction calculation device according to the present invention which calculates the correction amount of an exposure error value. The image processing circuit 20 corresponds to an exposure error correction device according to the present invention which corrects the exposure error of a sensed image.

As has been described above, the above embodiments can provide an image sensing apparatus, program, or recording medium which limits a correction amount for correcting the exposure error of a photographed image so as to prevent an excessively corrected image sensing result, and can obtain a desired image sensing result by changing the correction width of the correction amount in accordance with the setting state and operation state of the image sensing apparatus and the object brightness in image sensing.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
    an image sensing preparation member actuable by a user;
    an image sensing operation member actuable by the user;
    a first exposure level calculation device which, upon actuation of the image sensing preparation member, calculates a first exposure level based on a result of photometry, the first exposure level calculation device carrying out further processing if the image sensing operation member is actuated prior to completion of the calculation of the first exposure level, the further processing carried out by the first exposure level calculation device including determining whether the image sensing apparatus is in a predetermined mode or a manual exposure has been set, and, if so, the first exposure level calculation device continuing calculation of the first exposure level until completion of calculation of the first exposure level and, if not, the first exposure level calculation device discontinuing calculation of the first exposure level;

a second exposure level calculation device which calculates a second exposure level of an image signal output after image sensing;

an exposure error calculation device which calculates an exposure error between the first exposure level calculated by said first exposure level calculation device and the second exposure level calculated by said second exposure level calculation device; and an exposure error correction device which performs a correction operation of the exposure error by using the exposure error calculated by said exposure error calculation device, when said image sensing apparatus is in an auto exposure control mode, wherein said exposure error correction device does not perform the correction operation if the first exposure level calculation device carried out further processing and determined that the image sensing apparatus is in the predetermined mode or manual exposure has been set.

2. The apparatus according to claim 1, wherein when said image sensing apparatus is in at least one of a state in which an exposure correction value is set, a state in which an exposure condition obtained by photometry is held, a state in which a photometry method is set to spot photometry, and a state in which a long shutter mode is set, said exposure error correction device does not correct the exposure error.

3. The apparatus according to claim 1, wherein said exposure error correction device corrects the exposure error when said image sensing apparatus is set to a state in which a flash is so set so as to emit light, and when the flash is set to emit light, said exposure error correction device changes a correction width of the exposure error in consideration of elements which cause under exposure.

4. The apparatus according to claim 1, wherein, when said image sensing apparatus is in an operation state in which an exposure state is held upon actuating the image sensing preparation instruction member, and when a state in which the image sensing operation member is not actuated for not less then a given threshold time after the image sensing preparation instruction member is actuated, said exposure error correction device does not correct the exposure error.

5. The apparatus according to claim 1, wherein said exposure error correction device also does not perform the correction operation when a photometry method is set to spot photometry.

6. The apparatus according to claim 1, wherein said exposure error correction device also does not perform the correction operation when an exposure time upon image capturing is longer than a predetermined time period.

7. The apparatus according to claim 1, wherein said exposure error correction device also does not perform the correction operation when the image sensing operation member is actuated after a predetermined time has elapsed after actuation of the image sensing preparation member.

8. An image sensing method comprising:

actuating by a user of an image sensing preparation member;

a processing step of calculating, upon actuation of the image sensing preparation member, a first exposure level based on a result of photometry;

actuating by the user of an image sensing operation member;

a processing step of carrying out further processing, if the image sensing operation member is actuated prior to completion of the processing step of calculating the first exposure level, the further processing including determining whether an image sensing apparatus is in a predetermined mode or a manual exposure has been set, and, if so, the processing step of calculating the first exposure level continuing the calculation until completion of the calculation of the first exposure level and, if not, the processing step of calculating the first exposure level is discontinued;

a processing step of calculating a second exposure level of an image signal output after image sensing;

a processing step of calculating an exposure error between the first exposure level calculated by said first exposure level calculation step and the second exposure level calculated by said second exposure level calculation step; and a processing step of performing a correction operation of the exposure error by using the exposure error when the image sensing apparatus is in an auto exposure control mode, wherein the correction operation is not performed if the further processing is carried out and the further processing determines that the image sensing apparatus is in the predetermined mode or manual exposure has been set.

9. A computer-readable recording medium, on which is stored a computer program comprising instructions for causing a computer to execute an image sensing method defined in claim 8.

* * * * *